United States Patent [19]

Schütz

[11] 4,095,852
[45] Jun. 20, 1978

[54] MEASUREMENT SLIDING BEARING

[75] Inventor: Karl-Heinz Schütz, Schweinfurt, Germany

[73] Assignee: SKF Industrial Trading & Development Company B.V., Nieuwegein, Netherlands

[21] Appl. No.: 728,942

[22] Filed: Oct. 4, 1976

[30] Foreign Application Priority Data

Oct. 15, 1975 Germany .................. 7532718[U]

[51] Int. Cl.² .................................. F16C 23/02
[52] U.S. Cl. .............................. 308/3 R; 73/140; 308/1 A; 308/72; 340/269
[58] Field of Search .......... 308/1 R, 3 R, 1 A, 237 R, 308/73, 72, 194; 73/89, 140, 88 R, 141 R; 340/269

[56] References Cited

U.S. PATENT DOCUMENTS

| 3,176,286 | 3/1965 | Dschen | 340/269 X |
| 3,452,349 | 6/1969 | Wood | 340/269 |
| 3,510,185 | 5/1970 | McKee | 308/194 |

Primary Examiner—Trygve M. Blix
Assistant Examiner—Douglas C. Butler
Attorney, Agent, or Firm—Daniel M. Rosen

[57] ABSTRACT

A bearing assembly having inner and outer bearing rings and a plurality of sliding bearing disks, one of these disks being a force measurement sliding disk having the same dimensions as one of the sliding bearing disks and positioned between the rings in the main load zone of the bearing assembly as a replacement for one of the sliding bearing disks, the force measurement disk being in a recess position between the rings and the other disks and comprising a carrier member with a force measuring transducing element mounted thereon.

18 Claims, 6 Drawing Figures

MEASUREMENT SLIDING BEARING

BACKGROUND OF THE INVENTION

The present invention relates to a measurement sliding bearing, and particularly to measurement ball-and-socket bearings, with sliding elements located between the bearing rings and bearing disks.

Single-disk segment thrust bearings are already known with pressure elements for measuring the axial thrust. Both the pressure elements and the thrust segments are located in a common bearing ring mounted on the shaft. It is a disadvantage of these known designs that they comprise a series of individual parts which must be fitted together. In addition, the height of the known arrangements is relatively large so that they cannot be used everywhere. Furthermore, it is difficult to convert a standard bearing into a measurement bearing.

It is therefore an object of the present invention to provide a compact measurement sliding bearing of the above type with reduced height, comprising only relatively few parts.

It is a further object, in addition to the bearing function, to provide a novel construction which can also be used for the accurate measurement of forces, with the sliding elements easily exchanged for force measuring elements.

SUMMARY OF THE INVENTION

The foregoing objects of the present invention are achieved by a construction wherein the main load zone of the bearing is provided with at least one sliding element replaced by a force measuring element of the same dimensions. This element is located in a suitable recess between the bearing rings and bearing disks, respectively, and comprises a bearing carrier for the force measuring device and a sliding disk which is part of this carrier. The carrier for the force measuring device, in accordance with an embodiment of the present invention, is a metal ring with an L-shaped cross-section partially embedded in a recess of the sliding disk. The sliding disk can be made of plastic, and formed in such a way that one leg of the ring projects slightly from the disk and has a support surface which conforms to the bore or bearing surface of the adjacent bearing part. The cylindrical section of the metal ring in said recess is provided with wire strain gauges whose leads pass through drill holes or grooves in the metal ring.

The foregoing objects and advantages of the present invention will become more apparent from the following more detailed description of the several embodiments, and appended drawings:

DETAILED DESCRIPTION OF THE PREFERRED EMBODIMENTS

Figure 1:
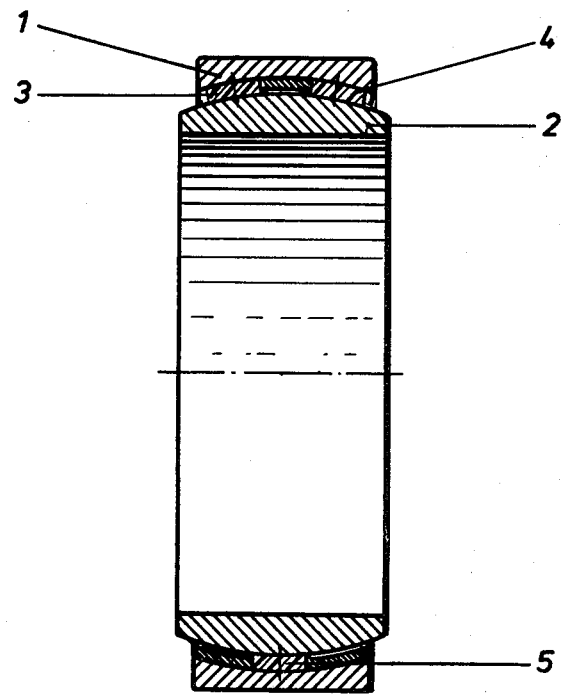
FIG. 1 shows a measurement sliding bearing with sliding disks and force measuring elements inserted between inside and outside ring, in section.
Figure 2:
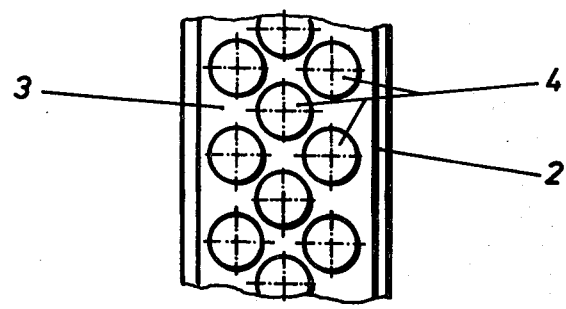
FIG. 2 shows part of the top view of a measurement ball and socket bearing of FIG. 1 without ring.

Referring to FIG. 1, there is shown a measurement ball-and-socket bearing comprising an outside ring or outer bearing member 1, an inside ring or inner bearing member 2, sliding disks 4 located in a perforated cage 3, and force measuring elements 5. FIG. 2, which shows part of the top view onto the measurement ball-and-socket bearing shown in FIG. 1, without the outside ring, illustrates the arrangement of the sliding disks 4 in the perforated cage 3 which is attached to the outside ring 1, for example, by welding. If the bearing is loaded via inside ring 2 vertically in the downward direction, the main load zone forms in the lower part of the bearing and is distributed over a number of supporting sliding disks 4. One or more of these sliding disks 4 are designed as force measuring elements 5 without foregoing their function as bearing elements in the bearing. Also, the force measuring element 5 can be replaced just as easily as a sliding disk 4.

Figure 3:
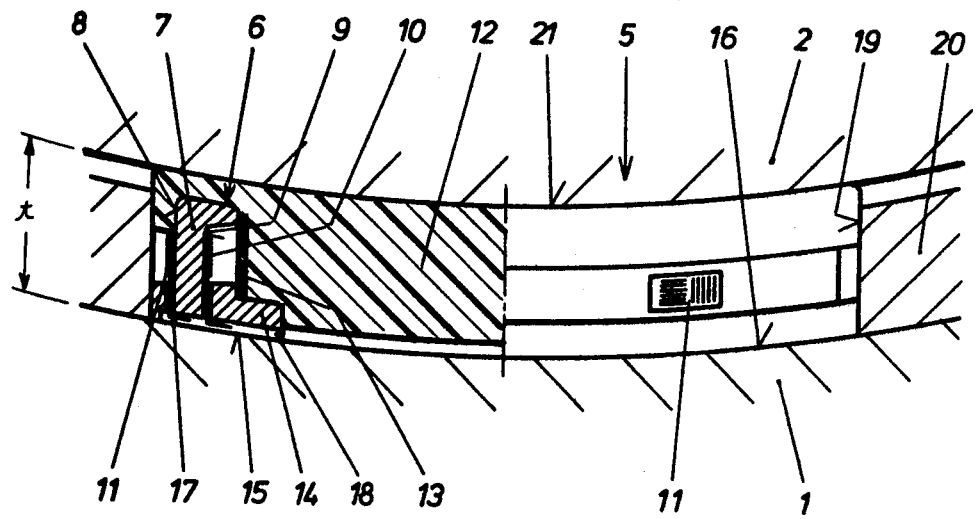
FIG. 3 shows a section of a force measuring element in accordance with the present invention.

A force measuring element 5, according to FIG. 3, comprises a sliding disk 12 and a metal ring 6 with an L-shaped cross-section. On the cylindrical section 7 of ring 6, on jacket or outer surface 8, and in the drill hole or inner surface 9, there are attached, as by gluing, wire strain gauges 10, 11 for measuring lengthwise and transverse stresses. The metal ring 6 is embedded, as by casting, in a sliding disk 12 of plastic material. The strain guages 10 provided in drill hole 9 are covered by a sleeve 13. Leg 14, of metal ring 6, facing the outside ring 1 (only indicated, not fully shown in the drawing), projects from the sliding disk 12 and is provided with a spherical surface 15 which is supported at the bore surface 16 of the outside ring 1. Leg 14 also has drill holes 17 and grooves 18 for holding wire leads (partially shown) to the various measurement locations, with the individual wire strain gauges 10, 11 connected to form a measuring bridge. The force measuring element 5 is located in a drill hole 19 of the perforated cage 20 and is provided with a spherical sliding surface 21 for the inside ring 2.

Figure 4:
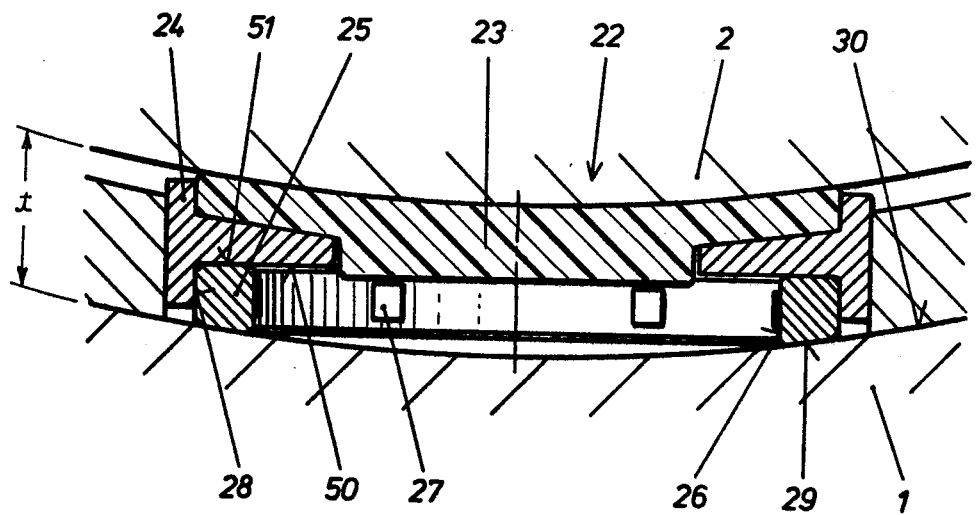
FIGS. 4, 5 and 6 each show sections through additional embodiments of force measurement elements in accordance with the present invention.

With reference to FIG. 4, there is shown a force measuring element 22 comprising a sliding disk 23, a metal ring 24 with a T-shaped cross-section and a measuring ring 25 whose bore surface 26 has wire strain gauges 27 pasted to it. The measuring ring 25 is located in a bore 28 of the metal ring 24. The spherical support surface 29 of the measuring ring 25 contacts the similarly contoured bore surface 30 of the outside ring 1 so that the load is transmitted from the inside ring 2 via the sliding disk 23 and metal ring 24 to the measurement ring 25.

Figure 5:
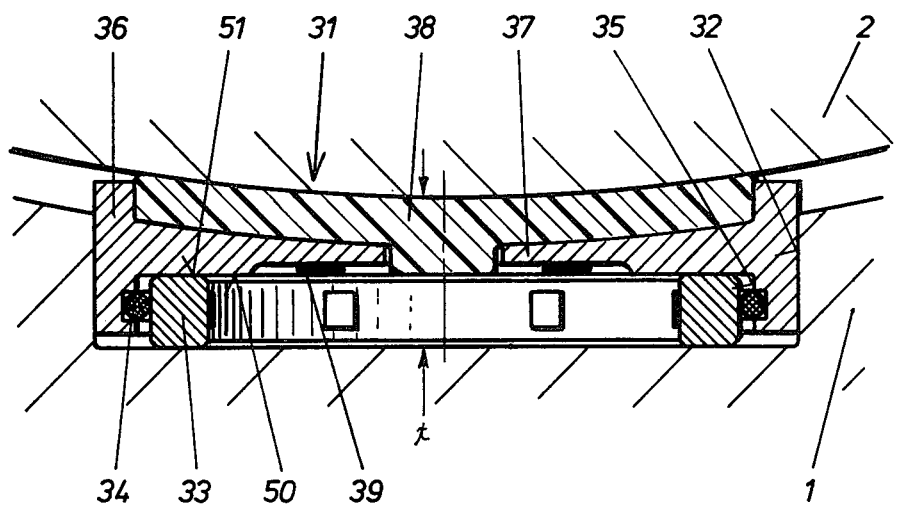

The force measuring element 31, shown in FIG. 5, which essentially has the same construction as that of FIG. 4, is seated directly in a suitable bore 32 of outside ring 1. In this embodiment, the measurement ring 33 is guided perpendicularly to the load direction through one or more elastic rings 34, which are made of plastic, so that no forces acting transversely to the main load direction can act via the bore surface 35 of the metal ring 36. The membrane-like section 37 of metal ring 36 has strain gauges 39 on the side facing away from the sliding disk 38, so that the strains of this section can be determined.

Figure 6:
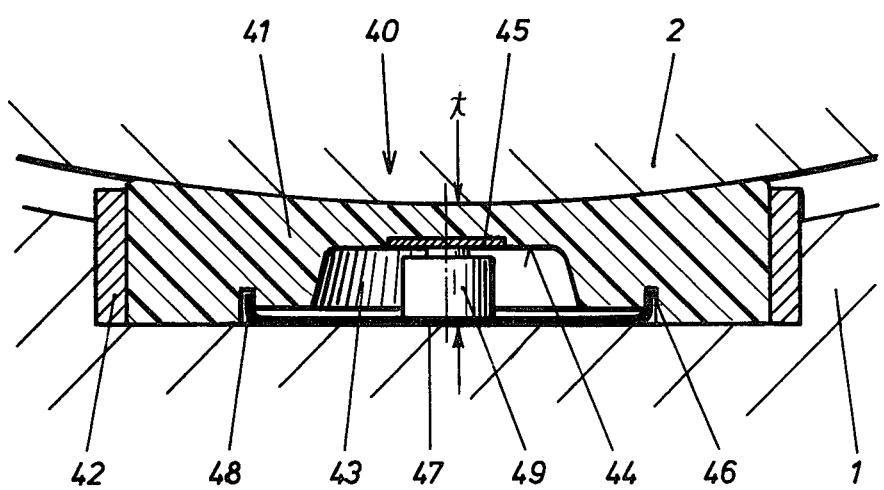

FIG. 6 shows a force measuring element 40 whose sliding disk 41 is enclosed by a metal ring 42 covering nearly the entire height. On the side facing away from inside ring 2, sliding disk 41 has a cavity 43 in whose bottom surface 44 a metal contact disk 45 is placed. A ring-shaped recess 46 of the sliding disk 41 holds a plane bottom plate 47 with an angled rim 48 to which an electromagnetic or capacitive pick-off 49 is fastened. The pick-off 49 contacts disk 45 and measures the deformations under load of sliding disk 41 in the radial direction.

It will be understood that the present invention is not restricted to the embodiments shown and described. Many variations are possible within the spirit and scope of the present invention. For example, the contact surfaces 50 and 51 of metal ring 24, 36 and of measurement ring 25, 33 can be made spherical or ball-shaped. Also, the force measuring elements 5, 22 can be placed directly in recesses of either the inside ring 2 or the outside ring 1.

This new measurement sliding bearing can be used to advantage for determining the weight of pivoting containers, for example, raw iron mixers, converters, etc. It is a special advantage that standard ball-and-socket bearings with slide inserts between the bearing rings can be easily converted into measurement bearings. It is only necessary to replace one or several sliding disks by one or several force measuring elements. This does not reduce the load-bearing capacity of the bearing because the force measuring elements assume their full share of the bearing load. The use of several force measuring elements, furthermore, permits very accurate measurement of the total force resulting from the various component forces, because force measuring elements with a small maximum load range can be used.

In summary, the figures illustrate bearing assemblies with various embodiments of the force-measuring bearing member between spherical surfaces of outer and inner bearing members 1 and 2. If the space between these members defines distance $t$, then in FIG. 3 of the new bearing member, for example, the disk part 12 has thickness in its axial direction less than $t$. Each of these bearing members comprises a sliding disk part in combination with a carrier means for a force-measuring or sensor means. The carrier means is an L-shaped ring 7 in FIG. 3, a T-shaped ring 24 plus a measuring ring 25 in FIG. 4, a T-shaped ring 36 plus measuring ring 33, plus elastic ring 34 in FIG. 5, and a more complex assembly in FIG. 6.

What is claimed is:

1. In a bearing assembly including first and second bearing rings with a main load zone, and a plurality of sliding bearing disks between and engaging said rings, the improvement in combination therewith of a force-measuring bearing member having the same general outside dimensions as said disks and situated between and engaging said rings as a replacement for one of said disks, said force-measuring member comprising a disk-like bearing element having an end part thereof engaging a first of said bearing rings, and a carrier with force-measuring transducing means mounted thereon, said carrier being a metal ring of L-shaped cross-section and coaxial with and secured to said bearing element with a leg portion of said L-shaped ring having a support surface with projects from said bearing element and slidingly engages said second ring.

2. A bearing assembly according to claim 1, wherein said force-transducing means comprises strain gauge means including wire leads, and said carrier ring includes an aperture through which said wire leads extend.

3. A bearing assembly according to claim 2, wherein said force-measuring member further comprises a cylindrical sleeve concentric with said carrier ring for covering the strain gauge means on said carrier ring.

4. In a bearing assembly including first and second bearing rings with a main load zone, and a plurality of sliding bearing disks between and engaging said rings, the improvement in combination therewith of a force-measuring bearing member having the same general outside dimensions as said disks and situated between and engaging said rings as a replacement for one of said disks, said force measuring member comprising a circular bearing element having an end part thereof slidably engaging a first of said bearing rings, a measuring ring having strain gauge means attached thereto, with a first part thereof slidably engaging the second of said bearing rings, and a carrier comprising a metal ring generally coaxial with said bearing element and measuring ring, said carrier ring having a T-shaped cross-section with the stem of the T extending transverse of the ring axis, and the cross-bar of the T forming flanges which define with the stem first and second recesses which engage and partially enclose said bearing element and measuring ring respectively.

5. A bearing assembly according to claim 4, wherein said second recess flange part and said measuring ring outer circumference define adjacent surfaces, and said force measuring member further comprises an elastic ring situated between and engaging said adjacent surfaces for absorbing forces therebetween.

6. A bearing assembly according to claim 4, wherein the portion of the carrier ring defining the stem of the T in cross-section forms a membrane transverse of the ring axis, and said force-measuring transducing means comprises strain gauge means secured to said membrane.

7. In a bearing assembly including first and second bearing rings with a main load zone, and a plurality of sliding bearing disks between and engaging said rings, the improvement in combination therewith of a force-measuring bearing member having the same general outside dimensions as said disks and situated between and engaging said rings as a replacement for one of said disks, said force measuring member comprising a disk-like sliding bearing element having an end part thereof engaging a first of said bearing rings and an opposite end part which defines therein a concentric cavity, a contact disk mounted in the bottom surface of said cavity, a plate closing said cavity, the outer surface of said plate slidably engaging the second of said bearing rings, and a force-measuring transducing means mounted in said cavity between said contact disk and plate, whereby force between said bearing rings is applied through said plate and contact disk to said transducing means.

8. A bearing assembly according to claim 7, wherein said second bearing ring defines a circular recess coaxial with said circular bearing element, and said force-measuring bearing member further comprises a metal ring circumscribing and engaging said bearing element and mounted in said circular recess.

9. In a bearing assembly including inner and outer bearing members with facing first and second spherical bearing surfaces spaced apart a distance $t$, a plurality of disk-shaped bearing elements between and engaging said surfaces, and cage means separating said elements, the improvement in combination therewith of a force-measuring bearing member having shape and size generally the same and being a replacement for one of said bearing elements, and comprising: a diskshaped element with a central axis, a first end surface slidably engaging one of said bearing surfaces, and a thickness less than $t$, circular carrier means generally coaxial with and engaging said disk element and having a second contact surface slidably engaging the other of said bearing surfaces, the distance between said contact surfaces being generally equal to distance $t$, and at least one sensor means secured to said carrier means for measuring forces thereon, whereby said force-measuring member measures forces transmitted between said bearing members.

10. A bearing assembly according to claim 9, wherein said carrier means is a ring having an L-shaped cross-section.

11. A bearing assembly according to claim 10, wherein said L-shaped cross-section defines a first leg generally parallel to the ring axis and a second leg transverse thereto, and said sensor means is a strain gauge secured to said first leg.

12. A bearing assembly according to claim 9, wherein said carrier means comprises a carrier ring having a T-shaped cross-section defining a stem part extending transverse of the ring axis, and a measuring ring carrying said sensor means and having one part engaging said stem part of the carrier ring and a second part conforming to and slidably engaging one of said spherical bearing surfaces.

13. A bearing assembly according to claim 12, wherein said measuring ring has a bore surface generally parallel to said bearing member axis, and said sensor means comprises strain gauge means secured to said bore surface.

14. A bearing assembly according to claim 9, wherein one of said spherical bearing surfaces defines therein a recess with a flat base surface, and said carrier means comprises a carrier ring having a T-shaped cross-section defining a stem part extending transverse of the ring axis, and a measuring ring carrying said sensor means and having one part engaging said stem part of the carrier ring and a second part normal to the axis of said carrier ring and conforming to and slidably engaging said base surface of said recess.

15. A bearing assembly according to claim 14, wherein said sensor means further comprises strain gauge means secured to said stem part of the carrier ring extending transverse of said ring axis.

16. A bearing assembly according to claim 15, wherein the carrier ring defines an axially extending flange portion adjacent the stem portion, said flange portion bore and said measuring ring outer circumference being adjacent surfaces, said bearing member further comprising an elastic ring between and engaging said adjacent surfaces, whereby said elastic ring absorbs and thereby substantially prevents transverse forces from being transmitted between said adjacent surfaces.

17. A bearing assembly according to claim 9, wherein said disk-shaped element has a recess defining an inner base surface in the end opposite that engaging a spherical bearing surface, and a contact plate on said inner base, and said carrier means comprises a cover plate covering said recess and engaging said second bearing surface, said sensor means being situated between said contact and cover plates, whereby forces between said bearing rings are transmitted through said plates to said sensor means.

18. A bearing assembly according to claim 17, wherein said second bearing surface defines a secondary recess, said bearing member further comprising a metal enclosure ring situated in said secondary recess and circumscribing and engaging said disk-shaped element.

* * * * *